Oct. 29, 1935.  B. M. HERMAN  2,018,670
PHOTOGRAPHIC CAMERA
Filed Nov. 6, 1934
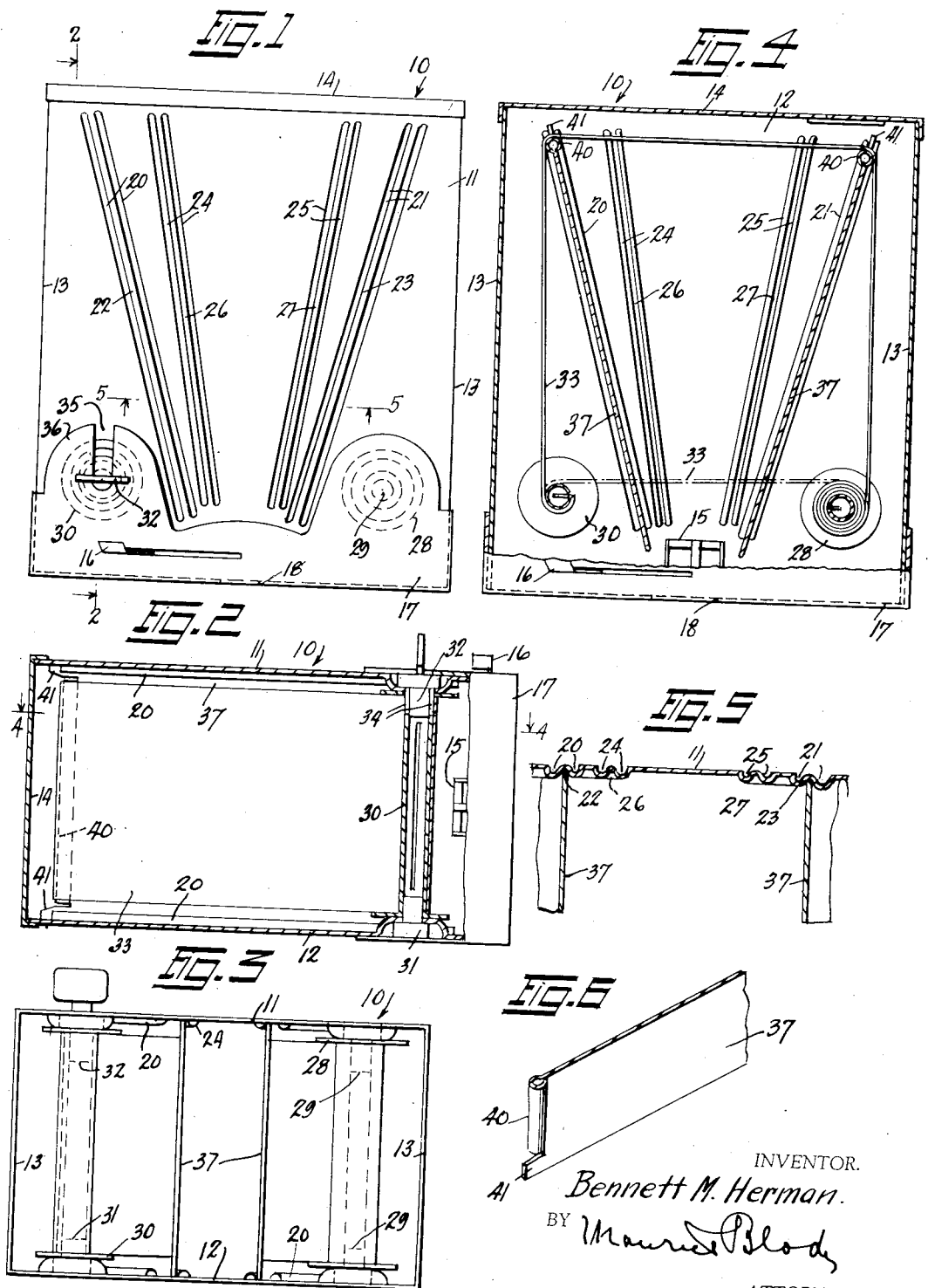
INVENTOR.
Bennett M. Herman.
BY Maurice Blody
ATTORNEY.

Patented Oct. 29, 1935

2,018,670

UNITED STATES PATENT OFFICE 2,018,670

PHOTOGRAPHIC CAMERA

Bennett M. Herman, Newark, N. J., assignor to Natalie Jeanne Herman, Newark, N. J.

Application November 6, 1934, Serial No. 751,689

7 Claims. (Cl. 95—31)

This invention relates to photographic cameras generally, and more particularly to film and film guiding means used in connection therewith.

One object of the invention is to produce a camera in which the film holding spools or reels are mounted near the front thereof, together with simple and readily operable means for moving the said film to the rear of the camera to position same in proper relation to the camera lens.

Another object of the invention is to produce such a camera in which the film positioning means is comprised of a pair of movable slides adapted to engage the film and move same from the front to the rear of the camera box.

A further object of the invention is to provide the said film positioning slides with means for guiding the film in its travel from one reel to the other.

A still further object of the invention is to provide such film guiding and positioning means which will keep the light rays confined and from spreading away from the film.

Yet another object of the invention is to provide slideways or grooves in the camera box which will prevent the camera box from bending or buckling.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which—

Figure 1 is a top plan view of my improved camera.

Figure 2 is a sectional view taken on line 2—2, Figure 1 with the lid shown only partly in section.

Figure 3 is a front view of the camera with the lid removed therefrom.

Figure 4 is a sectional view taken on line 4—4 Figure 2 with a portion of the lid shown in elevation.

Figure 5 is a fragmental sectional view taken on line 5—5 Figure 1, and

Figure 6 is a fragmental perspective view of one of the film positioning and guiding slides.

Referring now to the drawing in detail, 10 indicates a camera box or casing preferably made of thin sheet metal. The said casing 10 comprises top and bottom walls 11 and 12 respectively, side walls 13, and a rear wall 14. The lens 15, shutter (not shown) and shutter operating lever 16 are mounted in a lid or cover 17 which is removably maintained at the open front or mouth of the casing, the said lid being provided with the usual lens opening 18.

The top wall 11 and the bottom wall 12 are each provided with corrugations 20 and 21 to form outer diverging slideways 22 and 23 respectively, and with similar corrugations 24 and 25 to form inner diverging slideways 26 and 27 respectively. A film supply spool 28 is rotatably mounted at the right side of the front of the box or casing 10 upon studs 29 and a winding spool 30 is similarly mounted at the left of the box upon a lower stud 31. An upper stud 32 engages the upper portion of the spool 30 for rotating the said spool 30 to wind the film strip 33 thereon. The stud 32 is provided with fins 34 which engage slots in the spool 30.

To load the camera, the lid or cover 17 is slipped off the casing 10, a slot 35 being provided in the upper wall 36 thereof to clear the key or winding stud 32. The film supplying spool is then mounted upon the studs 29 and the film strip 33 is secured to the spool 30 as shown in dot and dash lines Figure 4. Slides 37 are then inserted into either the slideways 22 and 23 or into the slideways 26 and 27 depending upon the size of the picture desired, and pushed rearwardly until the film assumes the full line position shown in Figure 4. The lens and shutter carrying cap or lid 17 is then replaced and the camera is ready for photographing.

It will be noted that the central portion of the rear of the slide 37 is provided with a cylindrical or beaded edge 40 which engages the film strip. The said beaded portion provides means for preventing the cutting or cracking or otherwise marring the surface of the said film strip. It will be further noted that directly above and below the beaded edge 40 there are provided shoulders or projections 41 between which the film strip is guided.

It will also be understood that the slides 37 form a chamber for confining the light entering through the lens and prevents same from spreading away from the film.

From the foregoing, it will be seen that I have provided a simple and efficient film positioning and guiding means for cameras, the said means being removably mounted in the camera casing. Likewise, it will further be seen that the slideways in which the said film positioning and guiding means operate, form strengthening means for the camera casing.

Having described my invention, what I claim as new and desire to secure by Letters Patent is:

1. In a camera, a walled casing, means for mounting film spools in oppositely disposed walls in the said casing, spaced apart slideways in the said walls, and removable film positioning slides in the slideways.

2. In a camera, a walled casing, means for mounting film spools in oppositely disposed walls in the said casing, spaced apart slideways in the said walls, removable film positioning slides in the slideways, and a beaded film engaging edge on each of the said slides.

3. In a camera, a walled casing, means for mounting film spools in oppositely disposed walls in the said casing, spaced apart slideways in the said walls, removable film positioning slides in the slideways, a beaded film engaging edge on each of the said slides, and a pair of film guiding shoulders on the said slides, one above and the other below the said edge.

4. In a camera, a walled casing, means for mounting film spools in oppositely disposed walls in the said casing, corrugations in the said walls forming spaced apart grooved slideways, and removable film positioning slides in the said slideways.

5. In a camera, a walled casing, means for mounting film spools in oppositely disposed walls in the said casing, corrugations in the said walls forming spaced apart grooved slideways, the said slideways diverging from the front to the rear of the casing, and film positioning slides slidable in the said slideways.

6. In a camera, a walled casing, means for mounting film spools in oppositely disposed walls in the said casing, a plurality of spaced apart slideways on each of the said oppositely disposed walls on each side of an imaginary center line, and film positioning slides adapted to be removably mounted in the said slideways.

7. In a camera, a walled casing, means for mounting film spools in oppositely disposed walls in the said casing, means for forming a central light directing chamber of variable size, said means comprising a plurality of slideways on the said walls on each side of an imaginary center line, the slideways on one side of the said center line being equidistantly spaced from the corresponding slideways on the other side of the said line and diverging from the front of the casing to the rear thereof, and film positioning slides adapted to be removably mounted in the said slideways.

BENNETT M. HERMAN.